United States Patent [19]

Eckert

[11] Patent Number: 4,730,816

[45] Date of Patent: Mar. 15, 1988

[54] APPARATUS FOR CONTROLLING VEHICLE SPRING FIRMNESS

[75] Inventor: Konrad Eckert, Stuttgart, Fed. Rep. of Germany

[73] Assignee: Robert Bosch GmbH, Stuttgart, Fed. Rep. of Germany

[21] Appl. No.: 63,789

[22] Filed: Jun. 22, 1987

Related U.S. Application Data

[63] Continuation of Ser. No. 700,838, Feb. 12, 1985, abandoned.

[30] Foreign Application Priority Data

Apr. 14, 1984 [DE] Fed. Rep. of Germany ....... 3414258

[51] Int. Cl.$^4$ ................................................ F16F 9/50
[52] U.S. Cl. ................................. 267/64.11; 280/707
[58] Field of Search ................ 267/8 R, 64.11, 64.16, 267/64.17, 64.25, 167, 174, 179, DIG. 1, DIG. 2; 188/299, 314, 316, 318; 280/707, 708, 6 H, DIG. 1

[56] References Cited

U.S. PATENT DOCUMENTS

| | | | |
|---|---|---|---|
| 2,995,382 | 8/1961 | Heitzman | 280/708 |
| 3,366,378 | 1/1968 | Sons, Jr. | 267/64.16 |
| 3,603,574 | 9/1971 | Lutz | 267/8 R X |
| 3,689,103 | 9/1972 | Meulendyk | 267/64.16 X |
| 3,736,000 | 5/1973 | Capgras | 267/64.16 X |
| 3,836,166 | 9/1974 | Bainbridge et al. | 267/64.16 X |
| 3,871,635 | 3/1975 | Unruh et al. | 267/64.16 X |
| 3,995,883 | 12/1976 | Glaze | 280/707 |
| 4,091,897 | 5/1978 | Andrepont | 188/314 |
| 4,333,668 | 6/1982 | Hendrickson et al. | 280/707 X |
| 4,526,401 | 7/1985 | Kakizaki et al. | 188/299 X |
| 4,555,126 | 11/1985 | Ishimitsu et al. | 280/714 X |

Primary Examiner—Duane A. Reger
Attorney, Agent, or Firm—Edwin E. Greigg

[57] ABSTRACT

An apparatus for controlling the spring firmness of road vehicles is proposed, which is combined with a control of the shock absorber firmness. Both controls are performed using a single control valve. Trigger signals for the control valve are ascertained by means of an electronic device, which receives its signals from sensors, disposed on the vehicle, for spring travel, acceleration, vehicle speed and steering angle or the like, and in particular for the travel sensor, which picks up the shock absorber compression and emits it as a signal to the electronic device, with the goal of bringing about a change in the spring stiffness.

13 Claims, 3 Drawing Figures

APPARATUS FOR CONTROLLING VEHICLE SPRING FIRMNESS

This is a continuation of copending application Ser. No. 700,838 filed Feb. 12, 1985, now abandoned.

BACKGROUND OF THE INVENTION

The invention is based on an apparatus for controlling the spring firmness of a motor vehicle, preferably a road vehicle. An apparatus of this kind is known (German Pat. No. 16 30 058).

In this known apparatus, two work chambers of a shock absorber, or shock absorber leg, are connected via external lines to a device comprising a pump and two reservoirs. The only valves provided in the connecting lines to the shock absorber are one-way check valves. With an apparatus of this kind, however, the firmness of the shock absorber cannot be varied. To vary the spring firmness, energy must be supplied from outside, via the pump, which can only be accomplished relatively slowly and consumes power.

It is also known, from German Offenlegungsschrift 33 04 815, to vary the firmness of a shock absorber by using a separate control means.

In terms of spring and shock absorber firmness, the suspension of present-day vehicles, particularly passenger vehicles, is optimized for an average type of operation. The parameters are structurally fixed and remain unchanged during operation, except for the effects of aging. In extreme operating situations, such as with an empty or a fully loaded vehicle, such vehicles are far from optimally sprung; that is, the suspension is not optimally damped. These situations become still less optimal, the greater the ratio between the weights of an empty vehicle and the same vehicle carrying a maximum load.

A further consideration is that in order to save fuel and to use raw materials economically, the trend in designing new vehicles is increasingly toward a lightweight structure. Yet the usable load attainable will preferably not be reduced. In other words, in the future the above-mentioned weight ratio will become still greater, and it will be increasingly difficult to tune or compensate for the spring firmness and the shock absorber firmness.

OBJECT AND SUMMARY OF THE INVENTION

The apparatus described at the outset above, has the advantage over the prior art that the spring firmness are continuously variable during vehicle operation, and can be tuned optimally and automatically to such peripheral conditions as loading, load distribution on the axles, vehicle speed, longitudinal acceleration (using the accelerator pedal or braking) and transverse acceleration (driving around curves) and uneven road surfaces.

A further advantage is that such an adaptive springing apparatus can function without any significant supply of external energy; that is, it functions passively and thus very rapidly, which is a prerequisite for instance in controlling the tendency to swerving while driving around curves.

Finally, it is advantageous that all the possibilities for variation can be realized by means of a single control valve.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
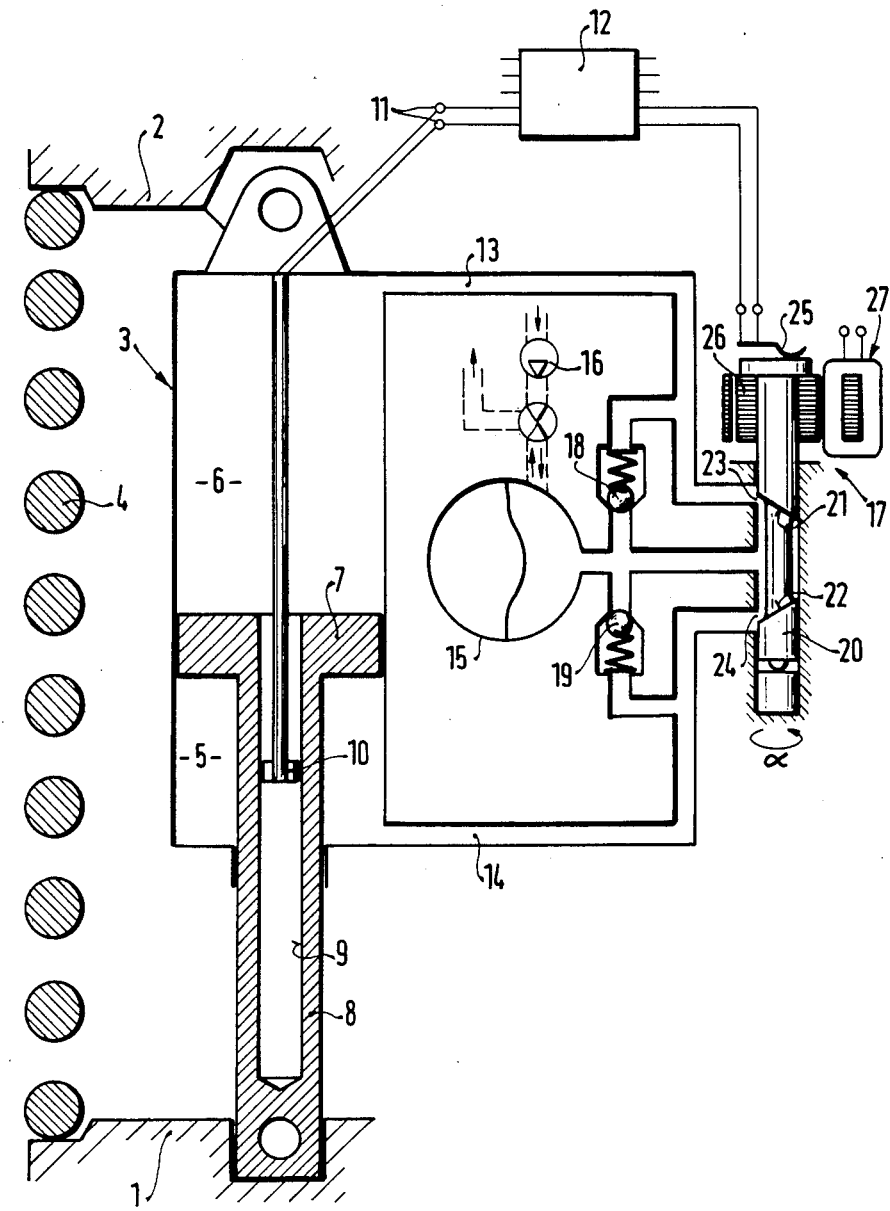
FIG. 1 shows the apparatus according to the invention.

Turning now to the drawings. An element 3 and a partially load bearing spring 4, embodied as a helical spring, are disposed between a vehicle axle 1 and a vehicle body 2. The element 3 will be called herein a "shock absorber"; however, it has not only a shock absorbing but a load bearing function. The shock absorber 3 has two work chambers 5 and 6, divided by a piston 7. The piston 7 has a relatively small diameter and is supported by a piston rod 8, which is provided with a blind bore 9 which communicates with the face of the piston 7. A sensor 10 protrudes into this blind bore 9 and is capable of emitting a signal for the shock absorber compression stroke. The signal is emitted via a connection 11 to an electronic device 12, which also receives sensor signals relating to acceleration, vehicle speed, steering angle and similar parameters.

Via two lines 13 and 14, the two work chambers 5 and 6 communicate with a hydropneumatic reservoir 15 and a pump 16. The pump may be omitted if a level control is dispensed with. Together with the reservoir 15, the shock absorber becomes a hydropneumatic spring. In addition, a control valve 17 is inserted into the connection between the two work chambers 5 and 6. Also inserted into this connection are two check valves 18 and 19, which operate in opposite directions from one another.

The control valve 17 is a magnet-actuated two-throttle valve, whichis embodied as a rotary slide valve. Its slide 20 has two oblique control edges 21 and 22, which cooperate with bore mouths 23 and 24 of the two lines 13 and 14. With the bore mouths 23 and 24, the control edges 21 and 22 form throttles 21/23 and 22/24, and hence together form a double throttle 21/23, 22/24.

The control valve 17 has a connection 25, by way of which it can be electrically triggered by the electronic device 12. The control slide is actuated by a magnet 26, which is combined with a position feedback 27. This position feedback 27 sends the signal of the valve position at any given time to the electronic device 12.

In its characteristics, the control valve 17 is a continuously operating valve. It operates at a frequency which may be higher by a factor of several times than the inherent frequencies occurring in the apparatus as a whole. As a result, the shock absorber firmness $D_H$ can be varied several times within one oscillation cycle.

Mode of Operation

The spring firmness and the shock absorber firmness are varied in accordance with various factors. These factors are detected by corresponding sensors and transmitted via sensor signals to the electronic device 12, in the same manner as the signal from the shock absorber sensor 10 is supplied to the electronic device 12. By the use of the pump 16, which does not need to have more than a small pumping volume, the volume in the work chamber 6 can be increased, or that in the work chamber 5 can be reduced, in order to vary the level of the vehicle body with respect to the axle. In varying the pressure in the shock absorber work chambers 5 and 6, a desired asymmetry of the shock absorption, to any arbitrary extent, can be generated. In this manner, the tuning possibilities of the apparatus according to the invention are increased considerably as compared with conventional apparatus, including hydropneumatic suspension. However, methods of this kind which simultaneously vary the average axle level, for instance a variation of $C_H$, that is, the stiffness or firmness of the hydropneumatic suspension, solely as a function of the stroke of the shock absorber 3 in one or both directions (compression, relaxation), should be excluded.

All the work of switching is performed with the single control valve 17. In the presence of a selected finite spring firmness, the control valve 17 is in the neutral position, if the vehicle axle 1 is at rest. This is the case, for instance, at the point of reversal of an axle oscillation, but it is also the case with a completely smooth road surface. This position of rest is ascertained in any arbitrary operating status and is fed into the electronic system. This is accomplished by integration from the travel S over a relatively long period of time T. The time T must be considerably longer than the period of a slow axle oscillation, because otherwise the high-frequency regulating processes and the superimposed process of of ascertaining an average value interfere with one another. In order to avoid drifting of the average or middle position, it is also conceivable to ascertain the travel S at a predetermined load G each time before the vehicle starts, with the axle at rest, and to store this in the electronic device 12 until the next time the vehicle stops.

During the stroke in both directions (compression and relaxation) of the shock absorber, the spring firmness is adjusted to the suspension component dictated by the hydropneumatic reservoir 15. The control valve 17 undergoes its maximal deflection when triggered accordingly. Then the spring firmness controllable by the control valve 17 assumes a minimum value. The control value 17 opens its throttles 21/23 and 22/24 to the maximum cross section; however, this is applicable to only one throttle 21/23 or 22/24.

If the throttle cross section were always closed, the spring firmness would become infinitely great. This is not desirable. From this, the conclusion can be drawn that the control valve 17 must, at all possible positions during operation, leave a remnant cross section open at its throttle restrictions 21/23 and 22/24.

Considered from a state of equilibrium, the apparatus according to the invention functions virtually symmetrically during both directions of the shock absorber stroke.

The existing shock absorber firmness is measured at every instant during operation of the apparatus, and the desired shock absorber firmness is calculated by the electronic device 12 and the control valve 17 is triggered accordingly.

In this manner, the firmness of the shock absorber is arbitrarily variable, and an asymmetry can be attained between the upper and lower work chambers of the shock absorber. Such a function is attainable no matter how the axle 1 is excited, without causing a change in the level.

Examples of Applications of the Invention

The variability of the overall characteristic, comprising the shock absorber firmness and the spring firmness, of the apparatus can be utilized in various ways:

1. Reduction of the spring firmness at low vehicle speed V (the guide variable is the velocity V).
2. Laterally symmetrical influence on the spring firmness in accordance with the measured transverse acceleration, or tendency to swerve, of the vehicle (roll regulation).
3. Influencing the front and rear axles in accordance with the vehicle deceleration or acceleration (pitch regulation).
4. Influence in accordance with the load status (level regulation).
5. Influence in accordance with the condition of the road or with the subjectively desired match between suspension and shock absorption, that is, whether a soft ride or a sportier, firmer ride is desired.

These points are ascertained by appropriate sensors and are supplied in the form of signals to the electronic device 12, which converts these signals into adjusting commands for the control valve 17.

Figure 2:
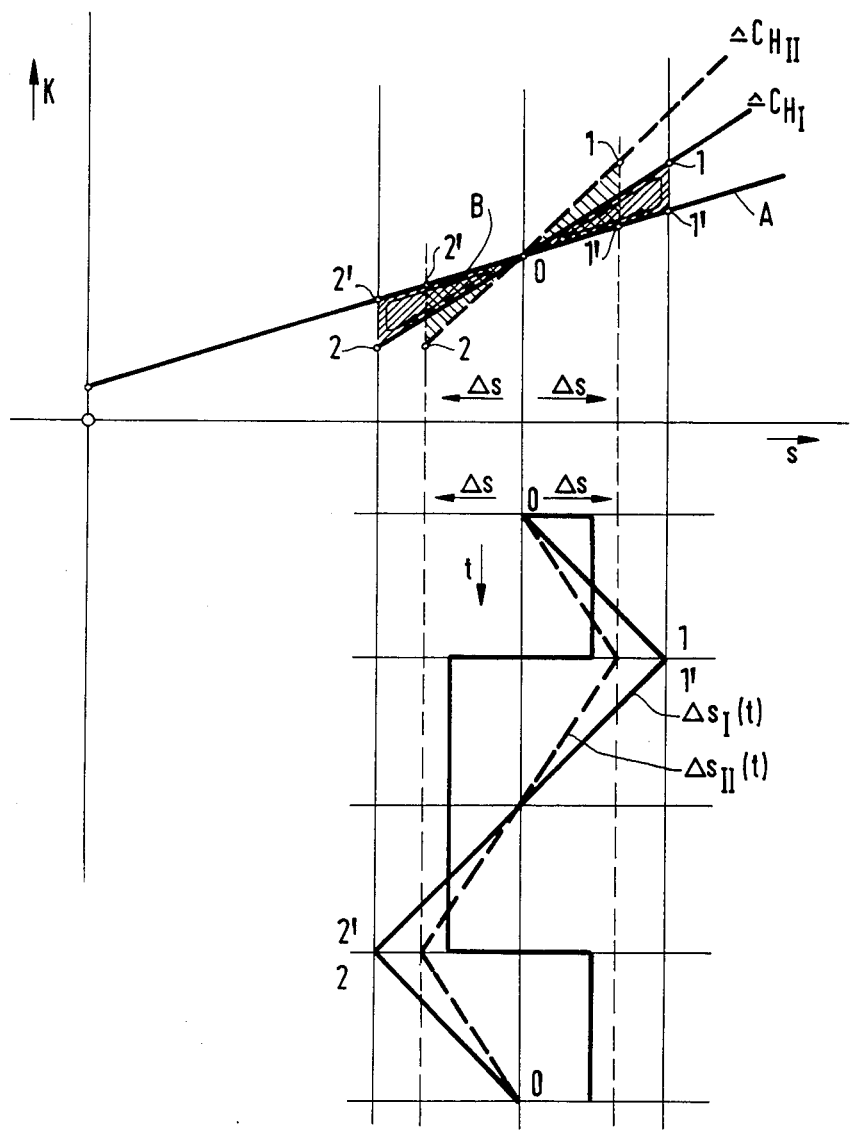
FIG. 2 is a diagram showing the course of pressure.
Figure 3:
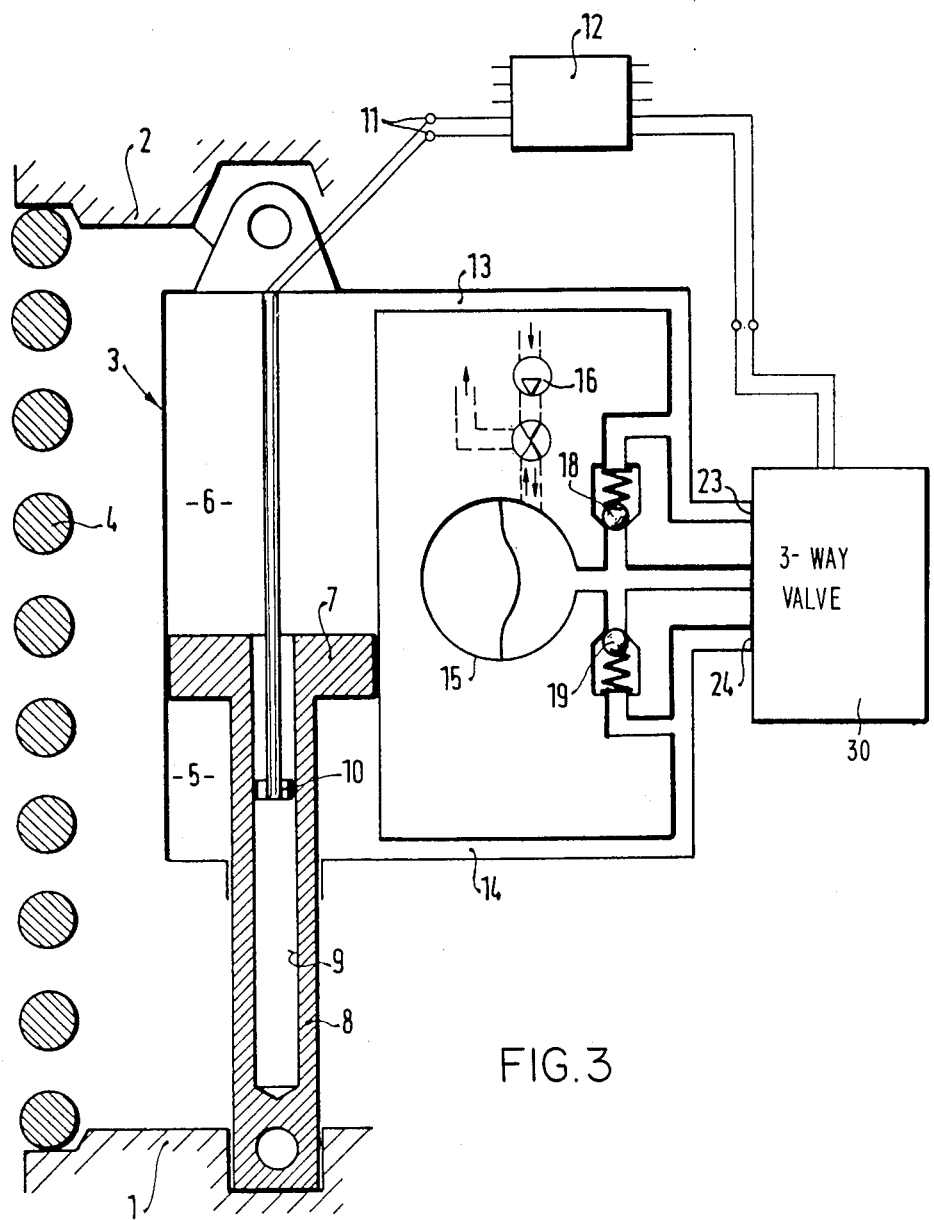
FIG. 3 is a modification of the control.

In the diagram shown in FIG. 2, the spring travel S is plotted on the abscissa and the force K of the apparatus according to the invention is plotted on the ordinate. A middle position, which represents the static point of equilibrium, is marked 0. Deflections $-\Delta S$ and $+\Delta S$ from this middle position are indicated. It should be noted that the base line A of the gas spring does not pass through the zero point of the diagram K (S). This static point of equilibrium is intersected by two straight lines $C_{HI}$ and $C_{HII}$, which characterize two different stiffnesses of the hydropneumatic spring. A continuous loop B indicates the variability of the spring firmness during one oscillation cycle from 0 via 1, 1' back to 0 and via 2, 2' back to 0.

Below the force/travel diagram, there is a time/travel diagram, which shows that the stiffness of the apparatus increases, without changing the level [of the vehicle body with respect to the axle].

The rapid-switching single control valve 17 is adjusted during the oscillation of the vehicle axle 1 such that a change in stiffness of the apparatus is the result. A mode of operation such as this is accordingly entirely different from one which superimposes an adjustment of shock absorption using a shock absorber.

The control valve 17 may be replaced by a three-way magnetic valve 30 such as shown in U.S. Pat. No. 3,989,063 where the pressure inlet is connected with the reservoir and the passages to the pressure receiver and the relief location are connected respectively to the work chambers via lines 13 and 14. The armature will be operated by signals from the electronic device 12.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An apparatus for controlling a spring-type firmness of a road vehicle, comprising a hydraulic load bearing element provided with two work chambers separated by a piston, a hydraulic control valve arranged to simultaneously communicate with a connection from each of said two work chambers and adapted to control fluid flow to and from each of said work chambers, each of said two work chambers being connected simultaneously to a hydropneumatic reservoir, said hydropneumatic reservoir and said hydraulic load bearing element adapted to serve as a hydropneumatic spring, said hydraulic load bearing element being connected at least to said hydropneumatic reservoir, a one-way check valve in a by-pass line between said reservoir and each of said work chambers that by-pass said hydraulic control valve, said hydraulic control valve being adapted to provide control of shock absorber firmness and level control for a suspension in said road vehicle, and means for operating said control valve at a frequency that is several times higher than inherent frequencies occurring in the overall vehicle suspension.

2. An apparatus as defined in claim 1, further wherein said hydraulic control valve is an electrically triggerable valve.

3. An apparatus as defined by claim 1, further wherein said hydraulic control valve is a magnetic valve.

4. An apparatus as defined by claim 3, further wherein said hydraulic control valve is a slide valve which functions with position feedback.

5. An apparatus as defined by claim 2, further wherein said hydraulic control valve is a continuously operated valve.

6. An apparatus as defined by claim 3, further wherein said hydraulic control valve is a continuously operated valve.

7. An apparatus as defined by claim 2, further wherein said hydraulic control valve is arranged to receive trigger signals from an electronic device, the input signals of which are generatable by means of sensor means for suspension, as well as for acceleration, vehicle speed, steering angle or the like, disposed on said vehicle.

8. An apparatus as defined by claim 3, further wherein said hydraulic control valve is arranged to receive trigger signals from an electronic device, the input signals of which are generatable by means of sensor means for suspension, as well as for acceleration, vehicle speed, steering angle or the like, disposed on said vehicle.

9. An apparatus as defined by claim 2, further wherein said hydraulic control valve is a 3/3-way valve.

10. An apparatus as defined by claim 7, further wherein said hydraulic control valve is a 3/3-way valve.

11. An apparatus as defined by claim 4, further wherein said hydraulic control valve is a 3/3-way valve.

12. An apparatus as defined by claim 5, further wherein said hydraulic control valve is a 3/3-way valve.

13. An apparatus as defined by claim 1, further wherein said hydraulic apparatus is combined with a partially loaded bearing spring, in particular a helical spring.

* * * * *